US007130600B2

(12) United States Patent
Chan et al.

(10) Patent No.: US 7,130,600 B2
(45) Date of Patent: Oct. 31, 2006

(54) APPARATUS, AND AN ASSOCIATED METHOD, FOR FACILITATING ENTRY OF LOCATION INFORMATION AT A WEATHER BAND RADIO OR OTHER RECEIVING STATION

(75) Inventors: Edmond Chan, Tai Po (HK); Sze Ming Patrick Kwong, Fanling (HK); Man Lung Lam, Tai Po (HK); Man Tai Vincent Lam, Sheung Shui (HK

(73) Assignee: RadioShack Corporation, Fort Worth, TX (US)

( * ) Notice: Subject to any disclaimer, the term of this patent is extended or adjusted under 35 U.S.C. 154(b) by 654 days.

(21) Appl. No.: 10/440,511

(22) Filed: May 19, 2003

(65) Prior Publication Data

US 2004/0235416 A1 Nov. 25, 2004

(51) Int. Cl.
*H04B 1/18* (2006.01)

(52) U.S. Cl. .............................. 455/186.1; 455/179.1; 455/150.1; 455/456.1

(58) Field of Classification Search ............ 455/179.1, 455/150.1, 186.1, 456.1, 456.2, 34.4, 152.1, 455/161.1, 404.2, 62, 456

See application file for complete search history.

(56) References Cited

U.S. PATENT DOCUMENTS

| | | | | |
|---|---|---|---|---|
| 6,112,074 | A * | 8/2000 | Pinder | 455/404.2 |
| 6,526,268 | B1 * | 2/2003 | Marrah et al. | 455/186.1 |
| 6,728,522 | B1 * | 4/2004 | Marrah et al. | 455/179.1 |
| 2004/0048573 | A1 * | 3/2004 | Clark | 455/62 |

* cited by examiner

*Primary Examiner*—Matthew D. Anderson
*Assistant Examiner*—Tan Trinh
(74) *Attorney, Agent, or Firm*—David Matthews

(57) ABSTRACT

Apparatus, and an associated method, for facilitating personalization of a weather band radio that receives SAME messages broadcast by the NWR system. Alphanumeric indicators of locations are displayed upon a user display element. And, a listener of the radio enters, by way of a user input actuator, selection of selected geographical areas, identified by the alphanumeric indicators. The selected alphanumeric location is used to form a six-digit location code defined by the Federal Information Processing Standards (FIPS). And, the code so-formed is used by the weather band radio, selectably to alert weather anomalies broadcast by the NWR system within the selected geographical area of interest.

20 Claims, 3 Drawing Sheets

APPARATUS, AND AN ASSOCIATED METHOD, FOR FACILITATING ENTRY OF LOCATION INFORMATION AT A WEATHER BAND RADIO OR OTHER RECEIVING STATION

The present invention relates generally to a manner by which to facilitate personalization of a weather band radio capable of detecting a SAME (Specific Area Message Encoding) message, or other indicia, in which a weather anomaly is alerted together with a geographic identifier. More particularly, the present invention relates to apparatus, and an associated method, by which to facilitate convenient set up of the weather band radio to personalize the radio. Once personalized, the radio alerts broadcasts of weather anomalies in a radio listener's area of interest.

An index is maintained at the weather band radio of alphanumeric representations of geographical names associated with the geographical areas. A user of the weather band radio sets up personalization of the radio by viewing the alphanumeric representations of the geographical name and selecting the geographical name of interest to the user. A multi-digit sequence, such as a six-digit FIPS (Federal Information Processing Standards) representation of a geographical area need not be entered by the user of the weather band radio. And, improved convenience of set up of the weather band radio is provided.

BACKGROUND OF THE INVENTION

The use of weather band radios by which to receive information associated with weather alerts and warnings provides listeners with information related to weather anomalies, such as severe weather warnings. As a result of improved ability of weather forecasting and reporting authorities, advanced warnings of potentially dangerous weather, and other, conditions are able to be forecast, tracked, and reported in timely manners.

The National Weather Service is an agency of the National Oceanic and Atmospheric Administration (NOAA) of the United States Department of Commerce. A voice radio broadcast system was initiated by the National Weather Service in the late 1950s. The weather broadcast service provided by the National Weather Service later was named the NOAA Weather Radio (NWR). The NWR is broadcast at a Very High Frequency (VHF) radio band, extending between 162.400 MHz and 162.550 MHz. Seven channels are defined within the frequency band and information is broadcast by transmitting stations located in various geographical regions.

The NWR, starting in the 1960s, broadcast a single tone at 1050 Hz, prior to the broadcast of a message relating to a potentially dangerous event. The single tone is sometimes referred to as a warning alarm tone (WAT). Weather band radios are sometimes operable to detect the warning alarm tone and, responsive to its detection, automatically to turn on the speaker of the weather band radio to annunciate aurally the detected tone.

In the 1980s, the National Weather Service implemented broadcast of digital codes together with the tone alerting the existence of the severe weather, or other, emergency condition. An NWR specific area message encoding (NWR SAME) is the standardized format of the digital code.

Weather band radio receivers constructed to detect the digital message are provided with the informational content of the digital message. An NWR SAME message includes various fields, including a field that identifies the geographic region associated with an accompanying weather alert message. The weather band radio capable of detecting the digital message and operating responsive thereto, is operated, if desired, to alert only weather alerts associated with a geographical area of interest of a listener of the weather band radio. The radio, however, must be personalized by the listener to operate in this manner. That is to say, the geographical area of interest to the listener must be identified and input into the radio. The code is a six-digit sequence that identifies and area, such as by state, then county, then portion of a county. Unlike a spelled name of an area, formed of a sequence of alphanumeric symbols, a six-digit sequence is less likely to be known by a listener of the weather band radio. Personalization of the weather band radio conventionally requires entry by the multi-digit code associated with the listener's area of interest. If the listener is unaware of the code, the listener must make separate inquiry of the code associated with the listener's geographical area of interest. The separate inquiry is oftentimes inconvenient and, sometimes, even unavailable to the listener. Personalization of the weather band radio to the listener's area of interest is inconvenienced by the need to resort to external inquiry or, if external inquiry is not available, the personalization of the weather band radio can not be effectuated.

If a manner could be provided by which to set up a weather band radio to facilitate its personalization to a listener's geographical area of interest, improved ease of set up of the weather band radio would be provided.

It is in light of this background information related to weather band radios that the significant improvements of the present invention have evolved.

SUMMARY OF THE INVENTION

The present invention, accordingly, advantageously provides apparatus, and an associated method, for a weather band radio capable of detecting a SAME (Specific Area Message Encoding) message, or other indicia, in which a weather anomaly is alerted together with a geographic identifer.

Through operation of an embodiment of the present invention, a manner is provided by which to facilitate convenient set up of the weather band radio to personalize the radio so that the radio alert broadcasts of weather anomalies in a radio listener's area of interest.

In one aspect of the present invention, an index is maintained at the weather band radio. The index includes alphanumeric, geographic names associated with geographic areas. Multi-digit sequences, e.g., FIPS (Federal Information Processing Standards) that also identify the geographic areas are indexed together with their associated alphanumeric counterparts.

A user of the weather band radio sets up personalization of the radio first by viewing the alphanumeric representations of the geographic name of the user's geographic area of interest. When the alphanumeric representation of the geographic area of interest to the user is located, the user effectuates selection of the selected alphanumeric representation. The multi-digit sequence associated with the alphanumeric representation is then used by the weather band radio as the user's geographic location of interest. When an SAME message contained in a signal detected by the weather band radio corresponds in value with the multi digit sequence indexed together with the alphanumeric name, the weather band radio alerts the reception together with the weather anomaly identified in the digital message.

In another aspect of the present invention, a user interface is utilized by which both to display the alphanumeric names of the geographic locations indexed by the index. And, the user interface includes a user input actuator, actuable by a user to enter a selection of the alphanumeric name of a geographic area contained in the index.

In another aspect of the present invention, the index of the alphanumeric names and multi digit sequences are updateable. The entries in the index correspond to the geographic areas identifiable in a digital message broadcast in the weather band frequencies and detectable by the weather band radio. If the number of geographic areas that are identifiable in the digital message change, the index is updateable to reflect the change. If, for instance, the number of geographic areas separately identifiable in the digital message is increased, the index is updateable to reflect the increase. In one implementation, changes to the index are user-entered by way of the user input actuator by the user of the weather band radio. In another implementation, the weather band radio is connectable to an external device to receive updates of the locations that are identifiable in the digital message. The external device is, for instance, a computer station from which the weather band radio receives downloads of the indications of the locations that are to be indexed at the index. The computer station receives the information through, for instance, a connection by way of the Internet to a content server that maintains updated information of the identifiable locations.

In another aspect of the present invention, the alphanumeric location indications are multi-level indications. That is to say, the alphanumeric location indications include general area indications and at least sub-area indications thereof. For instance, the alphanumeric location indications include state indications indicating geographical areas corresponding to states of the United States. And, each state indication is divided into countywide areas. And, each countywide area is divided into portions of county areas. In one implementation, a multi-level display is displayed upon a display element of a user interface. First, a statewide geographical area listing is displayed upon the display element. And, the user of the weather band radio selects one of the statewide geographical areas of interest. Upon selection of the statewide area of interest, a second level listing is displayed. The second level listing lists countywide areas associated with the selected state. And, the user of the weather band radio effectuates selection of a selected one of the countywide areas. And, upon selection of the selected countywide area, a third level listing of alphanumeric location indications is displayed. The third level alphanumeric location indications are of portions of the selected countywide area. By dividing the alphanumeric location indications into multiple levels of lists, a user of the weather band radio is able easily to select a geographical area of interest.

In these and other aspects, therefore, apparatus, and an associated method, is provided for a receiving station. The receiving station receives a signal having a digital component that identifies a weather anomaly and a coded identifier of a location with which the weather anomaly is associated. Receiving station set up is facilitated by which to cause the receiving station to alert a user of the receiving station of reception of signals containing the digital component in which the location identified therein encompasses a selected area. An index is formed of alphanumeric location indications indexed together with coded identifiers associated therewith. A selector is coupled to the index. The selector selectably operates to select, at least a selected alphanumeric indication contained in the index. A corresponding, selected coded identifier is associated with the selected alphanumeric location indication and defines the location of which reception of a signal received at the receiving station, containing a coded identifier of values of the selected coded identifier, is to be alerted.

A more complete appreciation of the present invention and the scope thereof can be obtained from the accompanying drawings that are briefly summarized below, the following descriptions of the presently-preferred embodiments of the invention, and the appended claims.

DETAILED DESCRIPTION

Figure 1:
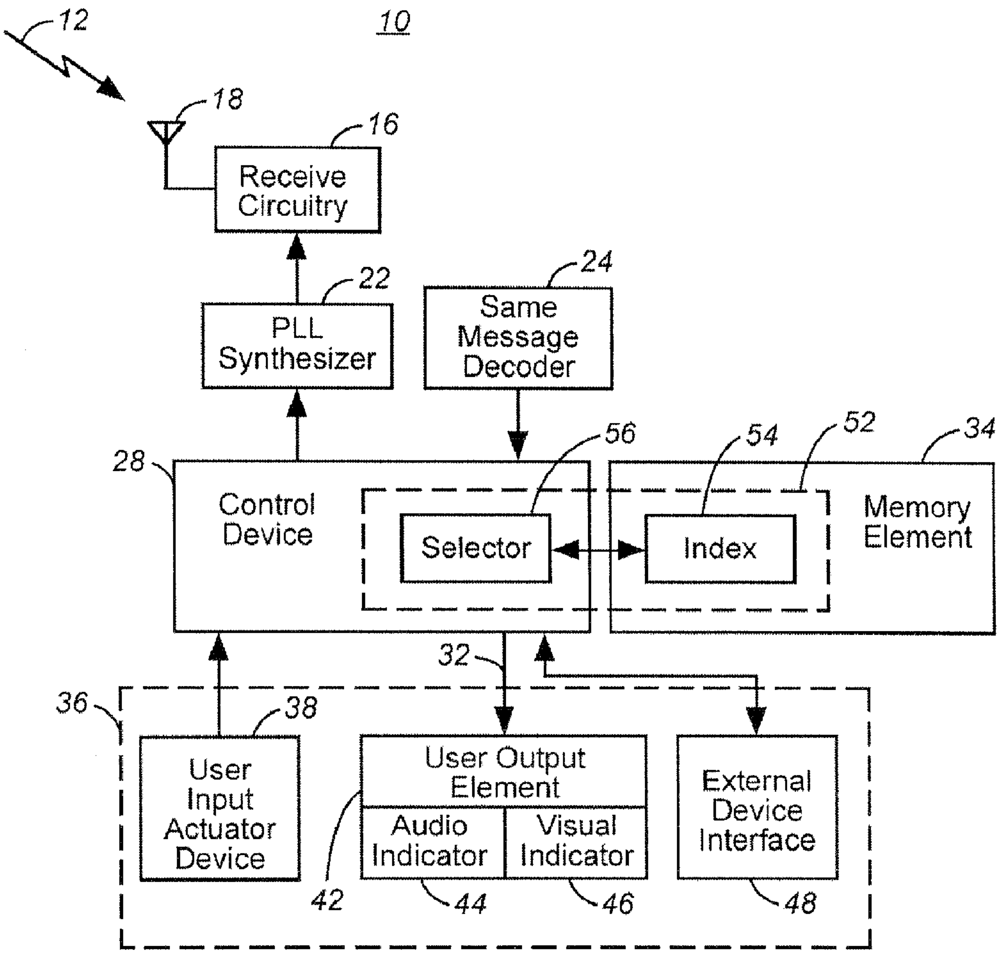
FIG. 1 illustrates a functional block diagram of a weather band radio in which an embodiment of the present invention is operable.

Referring first to FIG. 1, a weather band radio, shown generally at 10, operates to receive NWR broadcasts that are broadcast within the reception range of the radio. A signal broadcast by a transmitting station of the NWR system is represented by the arrow 12.

As mentioned previously, the National Weather Service provides a nationwide weather and emergency alerting service, provided by the National Oceanic and Atmospheric Administration (NOAA) that broadcasts continuous weather reports, emergency weather warnings, and additional hazard information upon seven weather band radio channels in a frequency band extending between 162.4 and 162.55 MHz. While, also as mentioned previously, the NWR broadcasts now generally also include SAME (Specific Area Message Encoding) messages included as a portion of the broadcast. The SAME message contains geographical information identifying an affected area associated with a weather anomaly condition. The SAME message, a six-digit message, identifies a selected one of over four thousand possible locations.

The weather band radio includes receive circuitry 16 coupled to an antenna transducer 18. The antenna transducer transduces the electromagnetic energy of the signal 12 into electrical form and provides an electrical representation of the signal to the receive circuitry. The radio also includes a PLL synthesizer 22 that is coupled to the receive circuitry. The PLL synthesizer, amongst other things, causes the receive circuitry to tune to a selected frequency channel, here one of the seven NWR channels. When properly tuned to a channel upon which the signal 12 is broadcast, the receive circuitry detects, and operates upon, representations of the receive signal. The radio also includes a SAME message decoder 24 coupled to the receive circuitry. The decoder 24 operates to decode the decode the SAME message forming a portion of the signal 12 detected by, and operated upon, the receive circuitry. The decoded messages decoded by the decoder are provided to a control device 28.

The control device operates to control operation of the weather band radio. And, here, operations of the control device include comparison operations to compare the values decoded by the decoder with selected values identifying a particular area of interest to a listener of the weather band radio. The control device generates a signal, here on the line 32, when the comparison indicates that the values contained in the SAME message of the signal 12 correspond to the selected values.

The weather band radio also includes a user interface 36 for a listener, or other user, of the weather band radio to facilitate its usage. More particularly, the user interface facilitates personalization of the weather band radio so that the control device compares a listener's geographic area of interest with the values of the SAME message decoded by the decoder 24.

The user interface 36 includes a user input actuation device 38, here a keypad having actuation keys actuable by a user of the weather band radio. And, the user interface also includes a user output element 42 having an audio indicator 44 and a visual indicator 46. The user interface also includes an external device interface 48. The external device interface permits connection of the weather band radio to an external device, such as a computer work station, to permit download of selected information to the weather band radio. Displays generated during operation of the weather band radio, as well as pursuant to operation of an embodiment of the present invention, are displayed at the user output element.

The control device 28 and memory element 34 also include elements of an embodiment of the apparatus 52 of an embodiment of the present invention. The elements of the apparatus 52 are functionally represented and are implementable in any desired manner, including, for instance, as algorithms executable by processing circuitry.

The apparatus 52 includes an index 54 at which alphanumeric indicators associated with geographic locations are indexed together with their associated SAME identifiers. In one implementation, the contents of the index 54 are updateable.

The apparatus 52 also includes a selector 56. The selector operates to select a selected entry contained in the index 54 so that the SAME values of the entry are used during comparison operations by the control device with values decoded by the decoder 24. The selector operates in conjunction with the user interface 36, which also forms a portion of the apparatus of the present invention.

During operation, a listener of the weather band radio personalizes the weather band radio so that the weather band radio annunciates alerts associated with the listener's geographical area of interest. During personalization operations, a listing of the alphanumeric indications of locations indexed at the index 54 are displayed at the visual indicator of the user output element 42. The user inputs selection of one of the displayed locations by way of the user input actuator 38. And, responsive to the user input, the selector 56 selects the index entry corresponding to the selection made by way of the user input actuator. And, the SAME code associated therewith is retrieved and used pursuant to comparison operations performed by the control device, selectably to cause annunciation by the audio indicator 44 or the visual indicator 46 of the user output element.

In one implementation, the listings displayed upon the user output element are multi-level. That is to say, multiple selections are made by the user of the weather band radio to select the selected geographical area of interest. First, an alphanumeric listing of wide area geographical areas, such as statewide areas is displayed. The user selects a selected wide area geographical area of interest. Then, alphanumeric representations of a listing of sub areas, such as countywide areas, are displayed. The user enters a selection of a selected sub area displayed at the out put element. And, responsive thereto, the selector 56 makes further selection of the numeric indicator associated with the sub area. And, an additional listing is displayed, further dividing the countywide area previously selected. The user of the weather band radio selects a selected sub area by way of the user input actuator, and the selector selects the numeric indicator indexed together with the selected alphanumeric identifier. Thereby, the values of a SAME message to be compared together with the decoded message is easily entered by the user of the weather band radio. Ease of personalization of the weather band radio to annunciate selected weather alerts is thereby facilitated.

Figure 2:
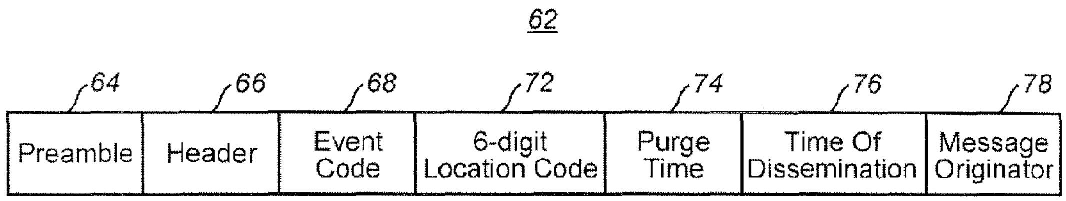
FIG. 2 illustrates a representation of the format of a SAME message string communicated to the weather band radio shown in FIG. 1.

FIG. 2 illustrates a representation, shown generally at 62, of the formatting of a SAME (Specific Area Message Encoding) message that forms part of the receive signal received by the weather band radio shown in FIG. 1. The message is transmitted at 520.83 bits per second, utilizing a frequency shift keying (FSK) modulation technique, here in which a logical '1' is coded as 2083 Hz and logical '0' is coded as 1562.5 Hz. The data bytes are transmitted with the least significant bits (LSBs) transmitted first. The first sixteen bytes of an hexadecimal AB of the message form the preamble 64 thereof. Then, a header field 66 is formed, consisting of ASCII "ZCZC" of the originator of the message. Then, an event code field 68 is provided. The event code inserted therein describes the type of alert message of the message. For example, FLS refers to a flood statement, WSA refers to a winter storm watch, etc. A six-digit location code field 72 follows. The field is populated with values that identify over what geographical area the warning message is effective. The values contained in this field are compared, as described above, by the control device 28, shown in FIG. 1. Additional fields of the message include a purge time field 74, a time of dissemination field 76, and a message originator field 78. The purge time indicates the validity period of the message and following is the original time of the dissemination of the message. The message originator field identifies the originator of the message.

Figure 3:
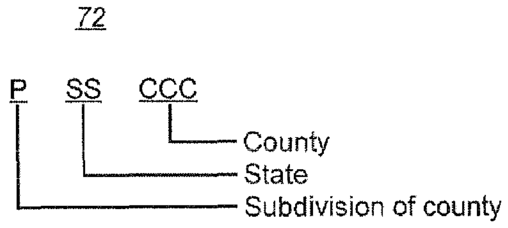
FIG. 3 illustrates the format of a multiple digit FIPS location code that forms a portion of the SAME message string shown in FIG. 2.

FIG. 3 illustrates the structure of the six-digit location code 72 forming part of the SAME message, the format of which is shown in FIG. 2. The first digit, P, has values between zero and nine. The value of the digit identifies a sub divided area of a countywide area. Selection of zero, for instance, means that the entire county is affected, or the county has not been sub divided. The second and third digits, SS, define the affected state, according to the FIPS (Federal Information Processing System) numbers. An undefined area, such as open waters of the Atlantic or Pacific oceans are described by special SS codes. The final three digits CCC specify the county of the state. The values 000 refer to an entire state described by SS to be affected.

Figure 4:
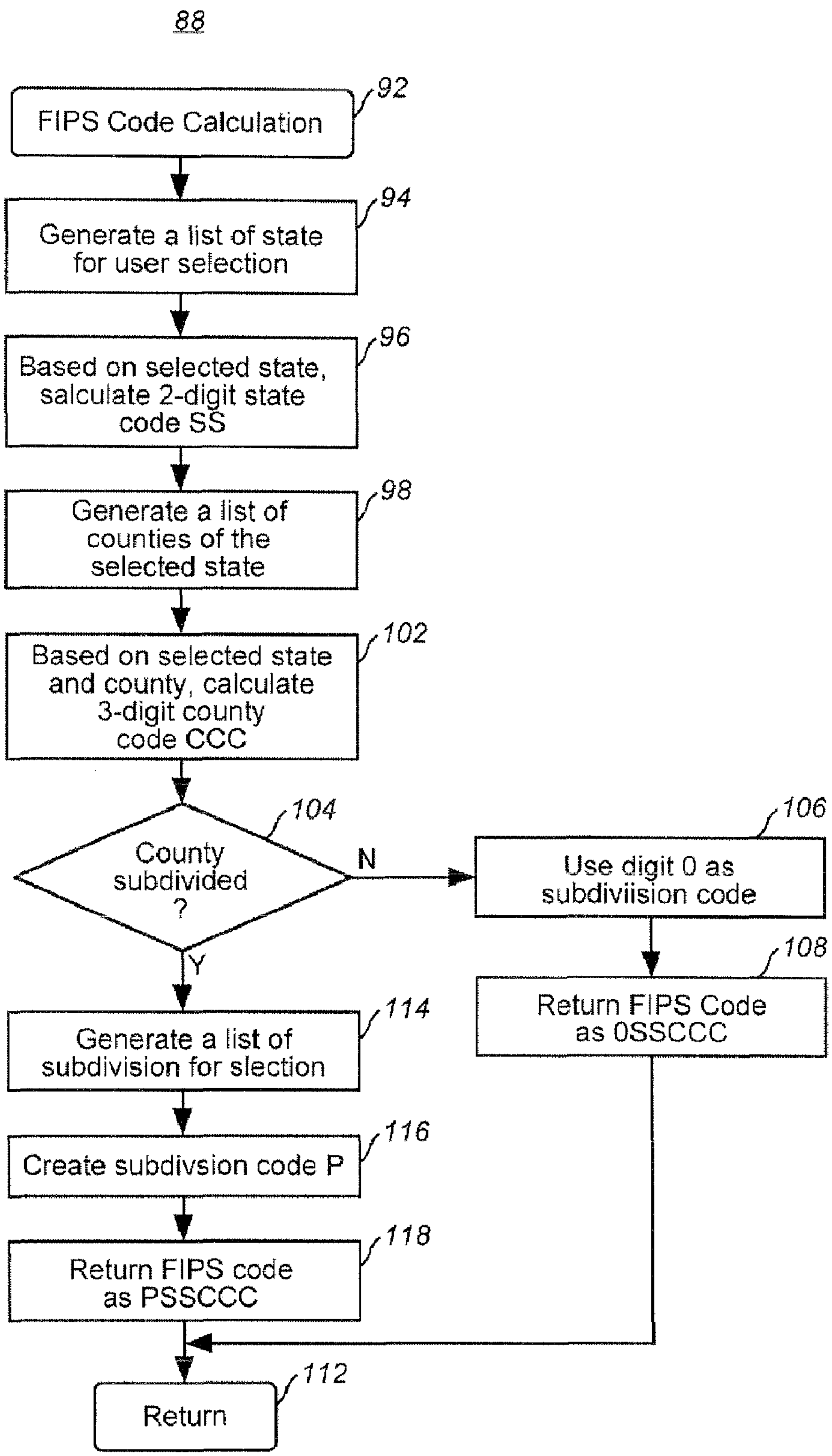
FIG. 4 illustrates a method flow diagram representative of the method of operation of an embodiment of the present invention by which to personalize a weather band radio pursuant to operation of an embodiment of the present invention.

FIG. 4 illustrates a flow chart, shown generally at 88, representing operation of an embodiment of the present invention by which to personalize a weather band radio, such as the weather band radio 10, shown in FIG. 1. Entry into the method flow is represented at the block 92 at which a FIP code calculation is commenced.

First, and as indicated by the block 94, a list of states is generated from which a user of the radio makes a selection. The listing that is displayed lists the states, e.g., in alphabetical order. And, the listener of the radio band radio makes selection thereof.

Responsive to the selected state, and as indicated by the block 96, a two digit state code is calculated, e.g., retrieved based upon the index associating the state listing, in alphanumeric form, and the associated state code.

Then, and as indicated by the block 98, a list of counties of the selected state is generated and displayed. Selection is made of a county of interest. And, responsive to the selected state and county, a three-digit county code, CCC, is calculated, indicated by the block 102, again, e.g., by indexing together the alphanumeric indicator of the county and the numeric county identifier associated therewith.

Then, and as indicated by the decision block 104, a determination is made as to whether the selected county is sub divided. If not, the no branch is taken to the block 106, and the digit zero is used as a subdivision code. And, as indicated by the block 108, the FIPS code is returned as 0SSCCC. A branch is then taken to the return block 112.

If, conversely, the county is subdivided, the yes branch is taken from the decision block 104, and a list of sub divisions is generated, as indicated by the block 114, for selection. Then, and as indicated by the block 116, a sub division code P is formed. Then, and as indicated by the block 118, the created FIPS code is returned in the form of PSSCCC. And, a branch is taken to the return block 112.

Thereby, the user of the weather band radio need only look at alphanumeric indicators of geographical areas, and the FIPS code associated therewith is formed based upon the user's selection of alphanumeric indicators.

The previous descriptions are of preferred examples for implementing the invention, and the scope of the invention should not necessarily be limited by this description. The scope of the present invention is defined by the following claims:

We claim:

1. In a receiving station that receives a signal having a digital component that identifies a weather anomaly and a coded identifier of a location with which the weather anomaly is associated, an improvement of apparatus for facilitating receiving station set-up by which to cause the receiving station to alert a user of the receiving station of reception of signals containing the digital component in which the location identified therein encompasses a selected area, said apparatus comprising:

an index formed of alphanumeric location indications indexed together with coded identifiers associated therewith; and a selector coupled to said index, said selector selectably operable to select, at least a selected alphanumeric indication contained in said index, a corresponding, selected coded identifier associated with the selected alphanumeric location indication defining the location of which reception of a signal received at the receiving station, containing a coded identifier of values of the selected coded identifier, is to be alerted.

2. The apparatus of claim 1 further comprising a user interface coupled to said index, said user interface having a user display for displaying, in human perceptible form, the alphanumeric location indications indexed at said index.

3. The apparatus of claim 2 wherein said user interface is further coupled to said selector and further has a user input actuator actuable by the user, and wherein selection made by said selector is further responsive to user actuation of the user input actuator.

4. The apparatus of claim 3 wherein said index is updateable, updates to said index selected by way of the user input actuator of said user interface.

5. The apparatus of claim 3 wherein the selection made by said selector is made of the alphanumeric location indications displayed upon the user display of said user interface.

6. The apparatus of claim 1 wherein said index is updateable, updates to said index effectuated by way of application of externally-generated update indicia applied to the receiving station.

7. The apparatus of claim 6 wherein selection made by said selector comprises selection of all of a selected first-level alphanumeric location indication, and a selected third level alphanumeric location indication, the selected second-level alphanumeric location indication a subset of the selected first level alphanumeric location indication, and the selected third-level alphanumeric location indication a subset of the selected second-level alphanumeric location indication.

8. The apparatus of claim 7 wherein the signal received by the receiving station is broadcast by a weather alerting authority, wherein the digital component of the signal comprises a Specific Area Message Encoding (SAME) message, wherein the coded identity of the location comprises a Federal Information Processing Standards (FIPS)-formatted sequence, and wherein the first-level alphanumeric location indication, the second-level alphanumeric location indication, and the third-level alphanumeric location indication are of values that together form a selected FIPS-formatted sequence.

9. The apparatus of claim 1 wherein the alphanumeric location indications indexed at said index comprise both first-level alphanumeric location indications and at least second-level alphanumeric location indications, the first-level alphanumeric location indications defining first geographical areas and the second-level alphanumeric location indications defining subsets of the first geographical location areas.

10. The apparatus of claim 9 wherein selection made by said selector comprises selection both of a selected first-level alphanumeric location indication and a selected second-level alphanumeric location indication, the selected second-level alphanumeric location indication a subset of the selected first-level alphanumeric location indication.

11. The apparatus of claim 9 wherein the alphanumeric location indications indexed at said index further comprise third-level alphanumeric location indications, the third-level alphanumeric location indications forming sub-subsets of the first geographical areas.

12. In a method of operating a receiving station that receives a signal having a digital component that identifies a weather anomaly and a coded identifier of a location with which the weather anomaly is associated, an improvement of a method for facilitating receiving station set-up by which to cause the receiving station to alert a user of the receiving station of reception of signals containing the digital component in which the location identified therein encompasses a selected area, said method comprising:

indexing together alphanumeric location indications and coded identifiers associated therewith to form an index; and selecting at least a selected alphanumeric indication contained in the index formed during said operation of indexing, a corresponding, selected coded identifier associated with the selected alphanumeric location indication defining the location of which reception of a signal received at the receiving station, containing a coded identifier of values of the selected coded identifier, is to be alerted.

13. The method of claim 12 further comprising the operation of selectably updating the index formed during said operation of indexing.

14. The method of claim 12 wherein selection made during said operation of selecting is user-initiated.

15. The method of claim 12 further comprising the operation, subsequent to said operation of indexing, of displaying a list of the alphanumeric location indications and wherein selection made during said operation of selecting is made of the list displayed during said operation of displaying.

16. The method of claim 15 wherein the selection made during said operation of selecting is made responsive to selected user actuation of a user actuator, said operation of selecting comprising actuating the user actuator.

17. The method of claim 15 wherein selection made during said operation of selecting comprises selection both of a selected first-level alphanumeric location indication and a selected second-level alphanumeric location indication, the selected second-level alphanumeric location indication a subset of the selected first-level alphanumeric location indication.

18. The method of claim 12 wherein the alphanumeric location indications indexed during said operation of indexing comprise both first-level alphanumeric location indications and at least second-level alphanumeric location indications, the first-level alphanumeric indications defining first geographical areas and the second-level alphanumeric location indications defining subsets of the first geographical location areas.

19. The method of claim 18 wherein said operation of selecting comprises selecting both a selected first-level alphanumeric location indication and a selected second-level alphanumeric location indication.

20. The method of claim 19 wherein the alphanumeric location indication further comprises third-level alphanumeric location indications, the third-level alphanumeric location indications forming subsets of the subsets of the geographical areas, and wherein said operation of selecting further comprises selecting a selected third-level alphanumeric location indication.

* * * * *